United States Patent Office 3,449,258
Patented June 10, 1969

3,449,258
**METHOD FOR PREPARING EUROPIUM ACTI-
VATED YTTRIUM OXIDE AND GADOLIN-
IUM OXIDE PHOSPHORS**
Richard C. Ropp, N. Caldwell, and Edward E. Gritz, East Rutherford, N.J., assignors to Westinghouse Electric Corporation, Pittsburgh, Pa., a corporation of Pennsylvania
Filed July 22, 1965, Ser. No. 474,102
Int. Cl. C09k 1/04
U.S. Cl. 252—301.4                      11 Claims

ABSTRACT OF THE DISCLOSURE

For preparing yttrium oxide or gadolinium oxide phosphors activated by europium, the rare-earth metals are placed in solution to which is added hydrogen peroxide. The rare-earth metals are then precipitated from the solution as oxalates, the precipitate is separated, and then fired in an oxygen-containing atmosphere to form the phosphors. The resulting phosphors have improved brightness both as a cathodoluminescent or photoluminescent material.

---

This invention generally relates to phosphor materials and, more particularly, to cathodoluminescent and photoluminescent phosphor materials and methods for preparing same.

Phosphor materials which emit in the long wavelength regions of the visible spectrum under cathode-ray excitation have particular use in color television systems. This is especially true for the red phosphor component of such systems since the red phosphor, until recently, has limited the screen brightness of color television, particularly when operated on a black and white picture signal. Red-emitting phosphors also have utility in conjunction with discharge devices such as fluorescent lamps. Such phosphors can be used alone for special applications or they can be blended with other phosphor materials in order to produce so-called deluxe fluorescent lamps which improve color rendition because they emit a relatively large amount of red radiations.

It is the general object of the present invention to provide methods for preparing phosphor materials which have a very bright emission in the red region of the visible spectrum under excitation either by ultraviolet radiations or cathode rays.

It is another object to provide methods for preparing phosphor materials which have a very bright emission in the red region of the visible spectrum and are particularly adapted for use with color television.

It is a further object to provide methods for preparing phosphor materials which have a very bright red emission under excitation by ultraviolet radiations and are particularly adapted for use with fluorescent lamps.

It is an additional object to provide red emitting phosphor materials which have particular application for use with fluorescent lamps.

The foregoing objects of the invention, and other objects which will become apparent as the description proceeds, are achieved by providing methods for preparing europium-activated yttrium oxide phosphor or europium-activated gadolinium oxide phosphor. In preparing either of these phosphors, there is formed a solution of europium compound and either yttrium or gadolinium-containing compound wherein the relative gram-atom proportions of europium and either yttrium or gadolinium in the solution are carefully controlled. There is added to this solution hydrogen peroxide in amount of at least 0.01 gram-mole per gram-atom of yttrium or gadolinium in the solution. Thereafter there is added to the solution sufficient oxalate-radical-containing material to coprecipitate the yttrium or gadolinium and europium from the solution as oxalates. The precipitate is separated from the residual solution and fired in an atmosphere comprising oxygen at a predetermined temperature and for a predetermined time sufficient to form the phosphor. There is also provided a very specific europium-activated gadolinium oxide photoluminescent phosphor composition which responds to ultraviolet excitation with a bright red emission.

For a better understanding of the invention reference should be had to the accompanying drawings wherein.

Figure 7:
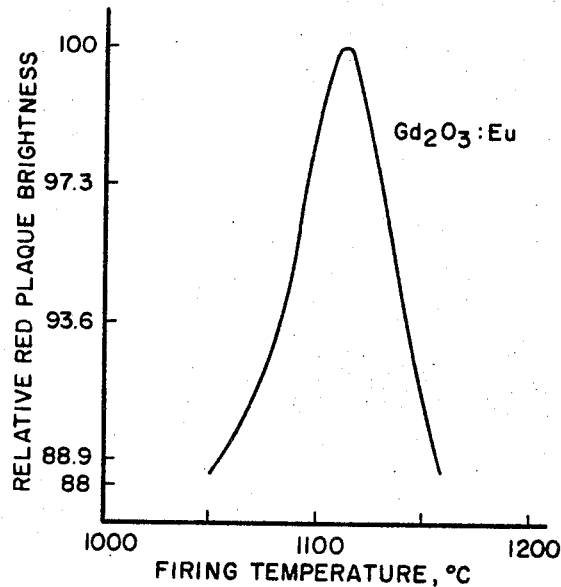
Figure 8:
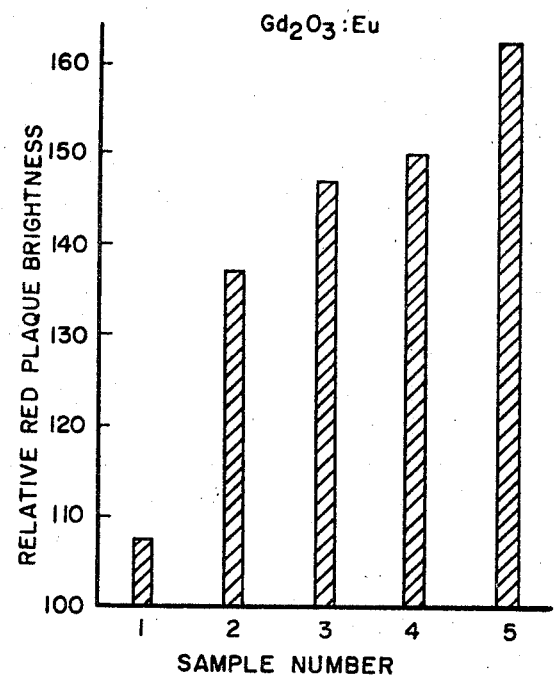

FIG. 7 is a graph of relative, red-plaque brightness versus firing temperature showing the changes in fluorescent brightness which are obtained at various firing temperatures for the improved europium-activtaed gadolinium oxide; and FIG. 8 is a graph of relative red-plaque brightness wherein it is shown how the brightness of europium-activated gadolinium oxide varies with different preparation conditions.

Cathodoluminescent phosphors

Figure 1:
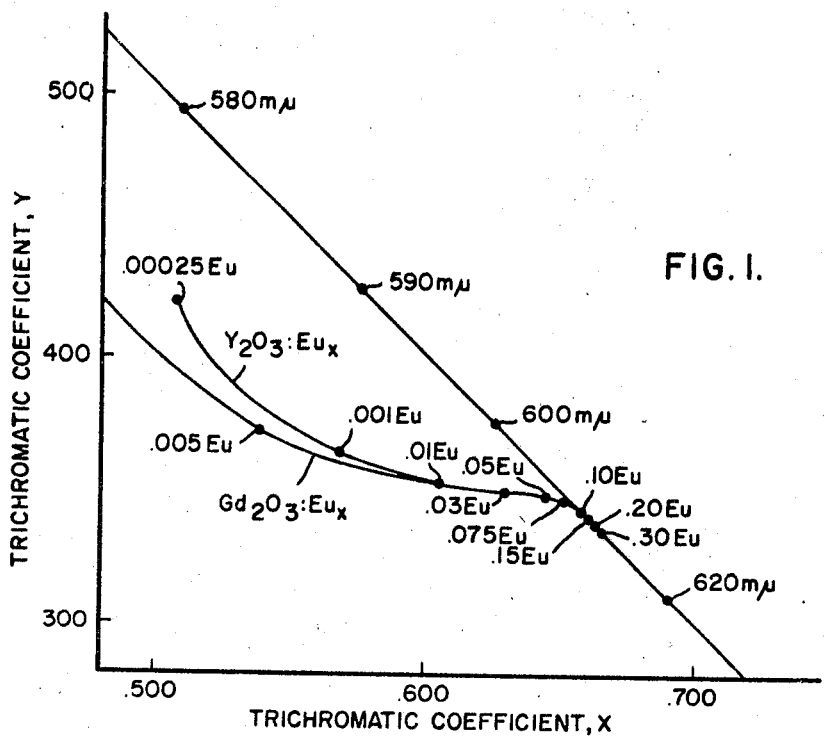
FIGURE 1 is a plot of trichromatic coefficient $y$ versus trichromatic coefficient $x$ showing the effect of composition on cathodoluminescent emission color for both europium-activated yttrium oxide and europium-activated gadolinium oxide.

The cathodoluminescent spectra associated with europium-activated gadolinium oxide were reported by Urbain in "Ann. de Chim. et Phys." 18 293 (1909). The cathodoluminescent and photoluminescent properties of europium-activated yttrium oxide are disclosed in French Patent 1,351,459. While is has been recognized that both the europium-activated yttrium oxide and gadolinium oxide possess a very high cathodoluminescent efficiency, neither of these materials have had the desired saturation of hue for use with color television systems. In conjunction with this statement, reference is made of FIG. 1 wherein it is shown that with increasing concentrations of europium activator, both of these phosphors shift in emission color toward a redder hue. When prepared in accordance with the best practices of the prior art, however, when either of the phosphors had a sufficiently large activator concentration to achieve the desired red hue, the brightness was not adequate.

In accordance with the present invention, either of the phosphors can be prepared by an improved method so that it will display the proper hue and still have the brightness desired for color television usage.

First considering the gadolinium oxide phosphor, in preparing this phosphor, there is formed a single solution of europium and gadolinium-containing compounds wherein the relative gram-atom proportions of europium to gadolinium in the solution is from 0.051:1 to 0.07:1. As a specific example, 361.8 grams gadolinium trioxide (9.99% pure) and 19.54 grams europium trioxide are dissolved in an aqueous solution comprising 450 cc. of reagent grade nitric acid plus 500 cc. distilled water. When the oxides are dissolved, the solution is diluted to five liters. Thereafter there is added to the formed solution, hydrogen peroxide in amount of at least 0.01 gram-mole per gram-atom of gadolinium in the solution. The solution is preferably heated to at least 80° C. and preferably is digested for a short time such as at least two minutes. As a specific example, the foregoing solution is heated to 80° C. and there is added thereto 600 cc. of 33% hydrogen peroxide, with the resulting solution digested for fifteen minutes. Thereafter there is added to the digested solution, sufficient oxalate-radical-containing material to coprecipitate the gadolinium and the europium from the solution as oxalates. As a specific example, there is added to the foregoing solution sufficient oxalic acid to precipitate all of the gadolinium and europium as oxalates and in order to insure complete precipitation, 10% excess oxalic acid is added over that amount required for complete precipitation. The precipitate is then separated, washed and dried. The resulting oxalate precipitate is fired in an atmosphere comprising oxygen at a predetermined temperature and for a predetermined time sufficient to form the phosphor. As a specific example, the precipitate is fired in air at a temperature of from about 1000° C. to 1200° C. for at least about thirty minutes.

Figure 2:
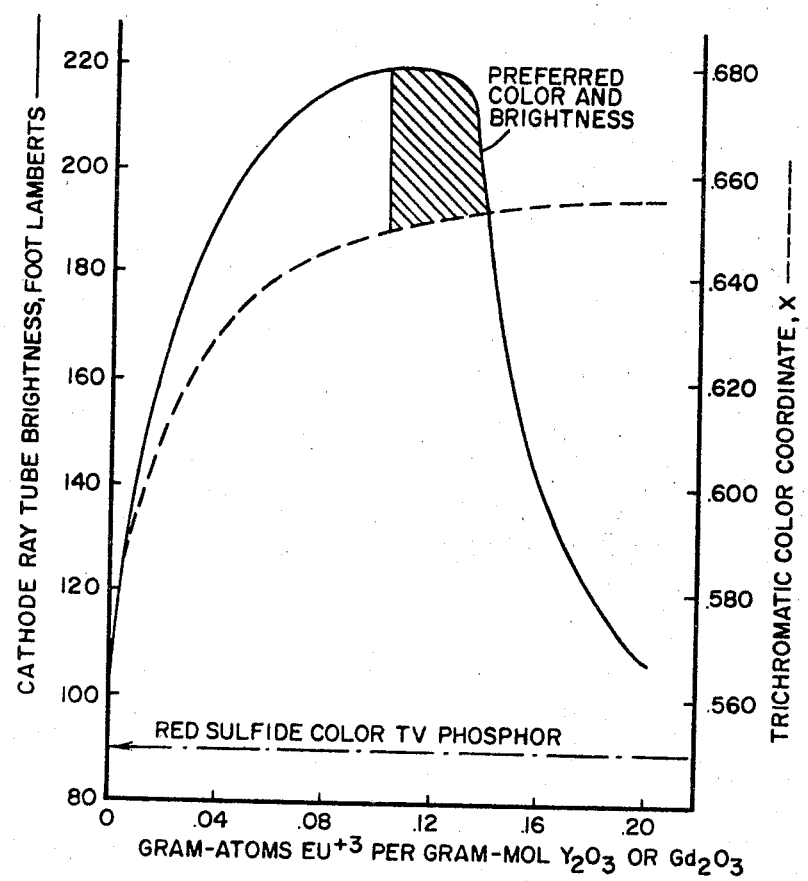
FIGURE 2 is a graph of cathode-ray brightness and trichromatic coefficient $x$ versus europium activator concentration in both gadolinium oxide and yttrium oxide phosphor prepared in accordance with the present invention, showing the effect of varying activator concentrations on cathode-ray brightness and emission color.

Apparently the presence of the oxidizing agent insures that all of the europium activator is in the tervalent state and this not only provides a red phosphor of the desired hue, but improved the luminous efficiency and brightness of the phosphor. The relative proportions of europium and gadolinium in the formed solution will govern the relative proportions of these materials which are in the final phosphor and in FIG. 2 are shown the permissible limits of europium activator if preferred color and brightness are to be obtained. In order that the phosphor is properly compounded, the gram-atom proportion of europium to gadolinium in the initially formed solution should be from 0.051:1 to 0.07:1.

Figure 4:
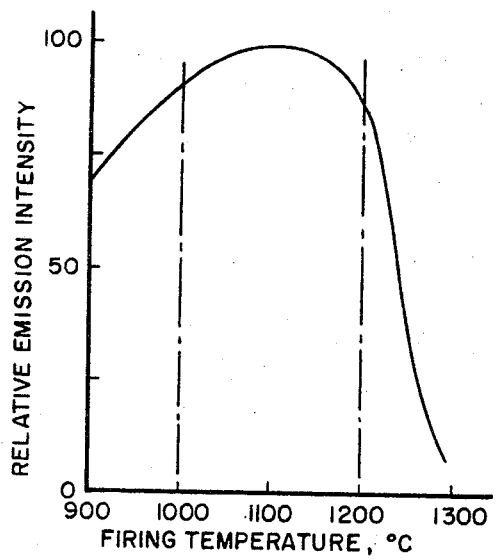
FIG. 4 is a graph of relative emission intensity versus firing temperature for europium-activated gadolinium oxide illustrating the effect of firing temperature on resulting cathode-ray brightness.

The firing temperature which is used in preparing the gadolinium oxide phosphor is not particularly critical and the varying brightness which are obtained with varying firing temperatures are shown in FIG. 4. The preferred firing temperature for preparing the cathodoluminescent phosphor material is about 1125° C.

As a specific example for preparing the cathodoluminescent europium-activated yttrium oxide phosphor, 964 grams yttrium trioxide (99.9% pure) and 41.32 grams europium trioxide are dissolved in 2000 cc. of reagent grade nitric acid to which is added 670 cc. distilled water. The resulting solution is diluted by adding thereto 7330 cc. of distilled water. This solution is heated to 80° C. and there is added thereto one liter of 30% hydrogen peroxide and the resulting solution is digested for twenty minutes. There is then added to the 80° C. solution fifteen liters of 14.8% oxalic acid solution heated to 80° C., with the rate of addition being 5263 cc. per minute. All of the yttrium and europium are coprecipitated as oxalates and the precipitate is separated, water washed and dried. The obtained precipitate is fired in an open silica boat in an air atmosphere at a temperature of 1350° C. for a period of four hours. The resulting phosphor is a very bright red cathodoluminescent material.

Figure 3:
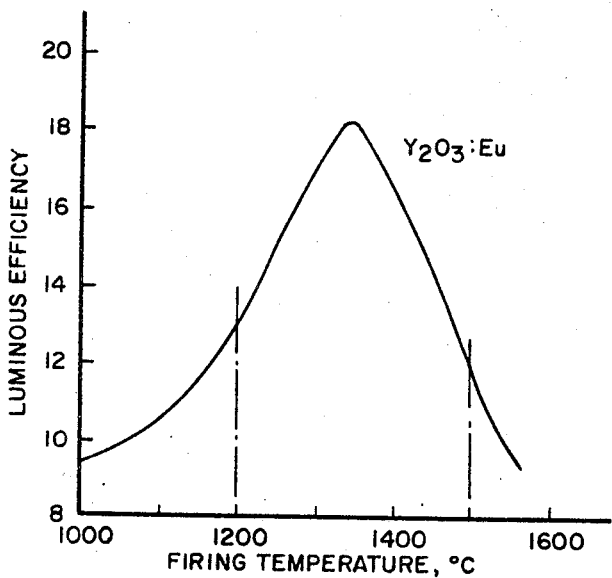
FIG. 3 is a graph of luminous efficiency in arbitrary units versus firing temperature showing how the firing temperature varies the cathodoluminescent brightness for europium-activated yttrium oxide phosphor prepared in accordance with the present invention.

In preparing the yttrium oxide cathodoluminescent phosphor, the firing temperature is preferably maintained from about 1200° C. and 1500° C. for at least about fifteen minutes, with the preferred firing temperature being about 1350° C. maintained for at least about thirty minutes. The variation in efficiency with varying firing temperatures is shown in FIG. 3.

Summarizing the cathodoluminescent phosphor embodiments, the europium and yttrium or gadolinium are present in relative gram-atoms proportions of from 0.051:1 to 0.07:1. The hydrogen peroxide which is added to the solution is present in amount of at least 0.01 gram-mole, and preferably 0.02 gram-mole, per gram-atom of yttrium or gadolinium in the solution and desirably the resulting solution is digested for a period of at least two minutes. In addition, it is preferred to heat the solution, prior to precipitation, to a temperature of at least 80° C. to decrease the water of hydration which is contained in the resulting precipitate. In precipitating the europium and gadolinium or yttrium from the solution, it is preferred to use oxalic acid although other oxalate-radical-containing material such as diethyl oxalate or dimethyl oxalate can be used. In the case of the gadolinium oxide embodiment, the precipitate is preferably fired in an atmosphere comprising oxygen at a temperature of from about 1000° C. to 1200° C. for a period of at least 30 minutes, with the optimum firing temperature being about 1125° C. the yttrium oxide embodiment preferably is fired at a temperature of from about 1200° C. to 1500° C. for a period of at least fifteen minutes, with the optimum firing temperature being about 1350° C. While the preferred firing atmosphere is an air atmosphere, any atmosphere which comprises oxygen can be used, since this will preserve the tervalent status of the europium.

Photoluminescent phosphors

First considering the yttrium oxide photoluminescent phosphor, in preparing this phosphor there is first formed a solution of europium- and yttrium-containing compounds wherein the relative gram-atom proportion of europium to yttrium in the solution is from 0.051:1 to 0.10:1. This of course controls the relative amounts of these elements in the final phosphor. As a specific example, 45.16 grams yttrium trioxide (99.99% pure) and 5.456 grams europium trioxide are dissolved in a solution of 90 cc. of reagent grade nitric acid plus 100 cc. distilled water. The resulting solution is diluted to a total of 500 milliliters. This solution is heated to 80° C. and there is added thereto 100 cc. of 30% hydrogen peroxide and this solution is digested for twenty-five minutes. Thereafter the europium and yttrium are precipitated as oxalates by adding to the solution an excess of 10% oxalic acid over that amount required to precipitate all of the yttrium and europium. The resulting precipitate is water washed and dried and is fired in an open silica crucible in an air atmosphere for four hours at a temperature of 1350° C. The resulting phosphor has a bright red emission and is suitable for use in conjunction with fluorescent lamps.

As in the previous embodiments, the hydrogen peroxide concentration for the present photoluminescent yttrium-oxide or gadolinium oxide phosphors should be such that there is at least 0.01 gram-mole, and preferably 0.02 gram-mole, of hydrogen peroxide per gram-atom of yttrium in the solution and preferably, the solution is digested for at least two minutes after the hydrogen peroxide is added thereto. In the case of the yttrium oxide photoluminescent phosphor, the firing temperature should be at least 1000° C. and the precipitate is fired for at least fifteen minutes, with the lower the firing temperature the longer the firing time. Preferably, the firing temperature is about 1350° C. and the firing time is at least about thirty minutes. As in the cathodoluminescent phosphor embodiment, it is preferred to heat the solution to a temperature of at least 80° C. before precipitation in order to minimize the water of hydration which is present in the precipitate.

Figure 5:
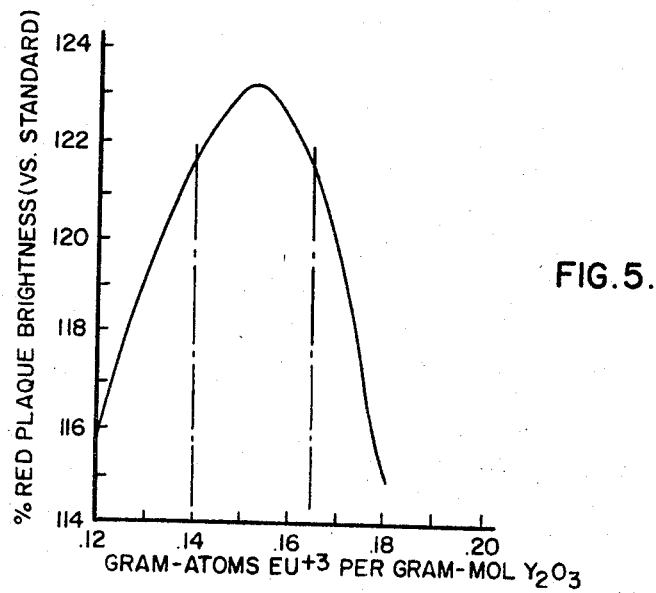
FIG. 5 is a graph of percent of red-plaque brightness versus europium activator concentration for europium-activated yttrium oxide prepared by the present improved method showing varying fluorescent intensities which are obtained with varying activator concentration.

For best fluorescent response, the relative gram-atom proportion of europium to yttrium in the solution before precipitation, and thus in the final phosphor, should be from 0.07:1 to 0.0825:1 and a graph of fluorescent brightness versus activator concentration is shown in FIG. 5. With activator concentrations less than 0.07:1, the color will shift more to the shorter wavelengths and with activator concentrations more than 0.0825:1, the brightness is decreased somewhat. It should be noted, however, that the phosphor will still be quite useful for photoluminescent applications when the gram-atom proportion of europium to yttrium is from 0.051:1 to 0.10:1.

As a specific example for preparing europium-activated gadolinium oxide photoluminescent phosphor, 361.8 grams of gadolinium trioxide (99.9% pure) and 20.984 grams of europium trioxide are dissolved in 450 cc. of reagent grade nitric acid which has added thereto 500 cc. of distilled water. The resulting solution is diluted to a total of five liters with distilled water. The diluted solution is heated to 80° C. and there is then added thereto 600 cc. of 30% hydrogen peroxide with the resulting solution being digested for fifteen minutes at 80° C. Oxalic acid is then added in amount sufficient to precipitate all europium and gadolinium as oxalates and to insure complete precipitation, 10% excess oxalic acid is used over that amount required for complete precipitation. The resulting precipitate is washed and then dried and fired in an open silica crucible for three hours in an air atmosphere at a temperature of 1125° C. The resulting phosphor is bright red and is very suitable for fluorescent lamp applications.

Figure 6:
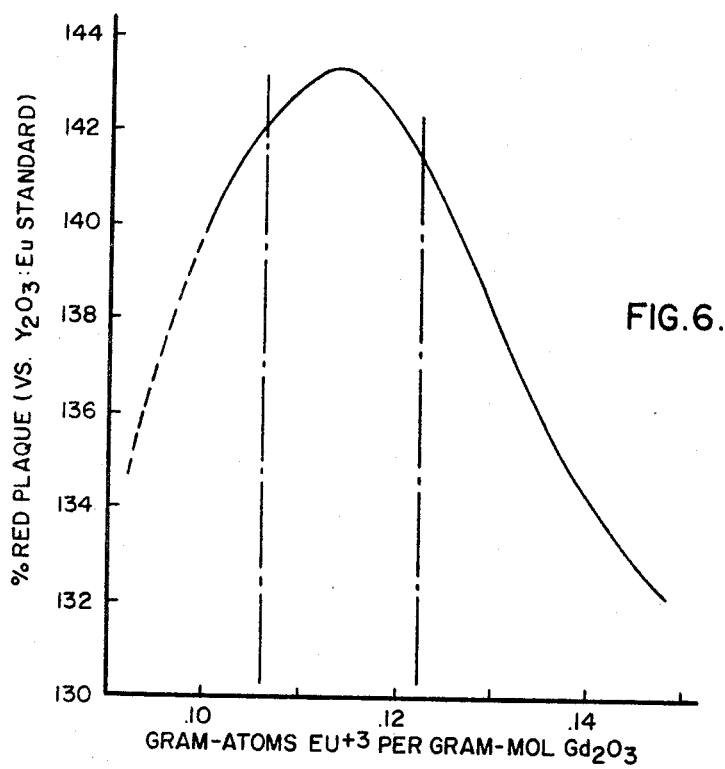
FIG. 6 is a graph of percent red-plaque brightness versus europium-activator concentration showing the effect of varying the activator concentration on fluorescent brightness for the improved europium-activated gadolinium oxide as described herein.

For best performance, the gram-atoms of europium are carefully controlled with respect to the gadolinium and the gram-atom proportions of europium to gadolinium in the initial solution should be from 0.053:1 to 0.062:1. This controls the amount of activator in the final phosphor and the graph of brightness versus activator concentration is shown in FIG. 6. With respect to the gadolinium oxide photoluminescent phosphor, the firing temperature preferably is from about 1000 to 1200° C. for at least about thirty minutes. Optimum firing conditions are an air atmosphere at a temperature of about 1125° C. for a period of from thirty minutes to five hours. A graph showing variations in brightness for firing temperatures which vary from the optimum for the gadolinium oxide phosphor embodiment is shown in FIG. 7.

For best results, after the europium and gadolinium are first precipitated as oxalates, these materials are preferably redissolved in nitric acid and reprecipitated before firing to form the phosphor. In FIG. 8 is shown the results of varying processing wherein "Sample No. 1" represents the phosphor formed by dissolving the oxides in nitric acid, evaporating and then firing. The results reported in "Sample No. 2" are obtained by dissolving the oxides in nitric acid, mixing therewith the specified hydrogen peroxide, precipitating at room temperature as oxalates and then firing. The results reported in "Sample No. 3" are obtained by dissolving the oxides in nitric acid, mixing therewith the hydrogen peroxide, precipitating immediately at a temperature of 80° C. to form coprecipitated oxalates and then firing. The results reported in "Sample No. 4" are obtained by dissolving the oxides in nitric acid, mixing therewith the prescribed hydrogen peroxide, digesting for 15 minutes, precipitating at a temperature of 80° C., and then firing. The results reported in "Sample No. 5" were obtained by first treating the material as in "Sample No. 4," but redissolving and then reprecipitating.

In all of the foregoing plaque brightness tests, excitation was a conventional 2537 A.U. source and the control sample was a similar phosphor prepared in accordance with the best-accepted techniques of the prior art, such as described in the aforementioned French Patent No. 1,351,459.

Comparative performance

Cathodoluminescent phosphors prepared in accordance with the present invention display a brightness approximately 240% greater than the best zinc-cadmium sulfides which have been used as the red phosphor component in color television. The color of these phosphors is substantially identical to that of the zinc-cadmium sulfide phosphor. Forty watt fluorescent lamps made with the photoluminescent phosphor embodiments of the present invention produced a 100-hour brightness of approximately 2700 lumens, with a very red color. Similar lamps made with manganese-activated magnesium fluorogermanate, which have a very similar color, have a 100-hour brightness of only 650 lumens. Thus the photoluminescent phosphors of the present invention are approximately 4.2 times as bright as that commercial phosphor which is nearest in hue.

The present phosphors can tolerate small amounts of tervalent ion impurities such as antimony or bismuth. As an example, 0.001 gram-atom of antimony or bismuth per gram-mole of yttrium oxide appears to have little affect on the performance of the phosphor.

It will be recognized that the objects of the invention have been achieved by providing a method for making an improved cathodoluminescent or photoluminescent phosphor. In addition, there has been provided an improved photoluminescent phosphor.

While phosphors prepared in accordance with the present invention have particular utility with respect to color television systems and fluorescent lamps, it should be understood that the phosphors can be used in any application where their photoluminescent and cathodoluminescent properties make them useful. As an example, the phosphors prepared in accordance with the present invention can be used in conjunction with fluorescent signs and displays as well as with any type of cathode-ray device.

We claim as our invention:

1. A method of preparing europium-activated yttrium oxide phosphor in order to improve its performance, said method comprising:
    (a) forming a solution of europium- and yttrium-containing compounds wherein the relative gram-atom proportion of europium to yttrium in such solution is from 0.051:1 to 0.10:1;
    (b) adding to the solution hydrogen peroxide in amount of at least 0.01 gram-mole per gram-atom of yttrium in said solution;
    (c) adding sufficient oxalate-radical-containing material to said solution to coprecipitate the yttrium and europium from the solution as oxalates;
    (d) separating the precipitate from the residual solution; and
    (e) firing the precipitate in an atmosphere comprising oxygen at a predetermined temperature and for a predetermined time sufficient to form said phosphor.

2. A method of preparing europium-activated yttrium oxide photoluminescent phosphor in order to improve its performance, said method comprising:
    (a) forming a solution of europium- and yttrium-containing compounds wherein the relative gram-atom proportion of europium to yttrium in such solution is from 0.051:1 to 0.10:1;
    (b) adding to the solution hydrogen peroxide in amount of at least 0.01 gram-mole per gram-atom of yttrium in said solution and digesting for at least two minutes;
    (c) adding sufficient oxalate-radical-containing material to said solution to coprecipitate the yttrium and europium from the solution as oxalates;
    (d) separating the precipitate from the residual solution; and
    (e) firing the precipitate in an atmosphere comprising oxygen at a temperature of at least 1000° C. for at least fifteen minutes with the lower the firing temperature the longer the firing time.

3. A method of preparing europium-activated yttrium oxide photoluminescent phosphor in order to improve its performance, said method comprising:
   (a) forming a solution of europium- and yttrium-containing compounds wherein the relative gram-atom proportion of europium to yttrium in such solution is from 0.07:1 to 0.0825:1;
   (b) adding to the solution hydrogen peroxide in amount of at least 0.02 gram-mole per gram-atom of yttrium in said solution and digesting for at least two minutes;
   (c) heating said solution to a temperature of at least 80° C. and adding sufficient oxalic acid to said solution to coprecipitate the yttrium and europium from the solution as oxalates;
   (d) separating the precipitate from the residual solution; and
   (e) firing the precipitate in an air atmosphere at a temperature of about 1350° C. for at least about thirty minutes.

4. A method of preparing europium-activated yttrium oxide cathodoluminescent phosphor in order to improve its performance, said method comprising:
   (a) forming a solution of europium- and yttrium-containing compounds wherein the relative gram-atom proportion of europium to yttrium in such solution is from 0.051:1 to 0.07:1;
   (b) adding to the solution hydrogen peroxide in amount of at least 0.01 gram-mole per gram-atom of yttrium in said solution and digesting for at least two minutes;
   (c) adding sufficient oxalate-radical-containing material to said solution to coprecipitate the yttrium and europium from the solution as oxalates;
   (d) separating the precipitate from the residual solution; and
   (e) firing the precipitate in an atmosphere comprising oxygen at a temperature of from about 1200° C. to 1500° C. and for a predetermined time sufficient to form said phosphor.

5. A method of preparing europium-activated yttrium oxide cathodoluminescent phosphor in order to improve its performance, said method comprising:
   (a) forming a solution of europium- and yttrium-containing compounds wherein the relative gram-atom proportion of europium to yttrium in such solution is from 0.051:1 to 0.07:1;
   (b) adding to the solution hydrogen peroxide in amount of at least 0.02 gram-mole per gram-atom of yttrium in said solution and digesting for at least two minutes;
   (c) heating said solution to a temperature of about 80° C. and adding sufficient oxalic acid to said solution to coprecipitate the yttrium and europium from the solution as oxalates;
   (d) separating the precipitate from the residual solution; and
   (e) firing the precipitate in an air atmosphere at a temperature of about 1350° C. for at least about thirty minutes.

6. A method of preparing europium-activated gadolinium oxide phosphor in order to improve its performance, said method comprising:
   (a) forming a solution of europium- and gadolinium-containing compounds wherein the relative gram-atom proportion of europium to gadolinium in such solution is from 0.051:1 to 0.10:1;
   (b) adding to the solution hydrogen peroxide in amount of at least 0.01 gram-mole per gram-atom of gadolinium in said solution;
   (c) adding sufficient oxalate-radical-containing material to said solution to coprecipitate the gadolinium and europium from the solution as oxalates;
   (d) separating the precipitate from the residual solution; and
   (e) firing the precipitate in an atmosphere comprising oxygen at a predetermined temperature and for a predetermined time sufficient to form said phosphor.

7. A method of preparing europium-activated gadolinium oxide photoluminescent phosphor in order to improve its performance, said method comprising:
   (a) forming a solution of europium- and gadolinium-containing compounds wherein the relative gram-atom proportion of europium to gadolinium in such solution is from 0.053:1 to 0.062:1;
   (b) adding to the solution hydrogen peroxide in amount of at least 0.02 gram-mole per gram-atom of gadolinium in said solution and digesting for at least two minutes;
   (c) adding sufficient oxalate-radical-containing material to said solution to coprecipitate the gadolinium and europium from the solution as oxalates;
   (d) separating the precipitate from the residual solution; and
   (e) firing the precipitate in an atmosphere comprising oxygen at a temperature of from about 1000° C. to 1200° C. for at least about thirty minutes.

8. A method of preparing europium-activated gadolinium oxide photoluminescent phosphor in order to improve its performance, said method comprising:
   (a) forming a solution of europium- and gadolinium-containing compounds wherein the relative gram-atom proportion of europium to gadolinium in such solution is from 0.053:1 to 0.62:1;
   (b) adding to the solution hydrogen peroxide in amount of at least 0.02 gram-mole per gram-atom of gadolinium in said solution and digesting for at least two minutes;
   (c) heating said solution to a temperature of at least 80° C. and adding sufficient oxalic acid to said solution to coprecipitate the gadolinium and europium from the solution as oxalates;
   (d) separating the precipitate from the residual solution; and
   (e) firing the precipitate in an air atmosphere at a temperature of about 1125° C. and for a period of from thirty minutes to five hours.

9. The method as specified in claim 8, wherein after the precipitate is separated from the residual solution, and before the precipitate is fired, the precipitate is again formed into a solution in accordance with step (a), and thereafter steps (b) through (d) are repeated.

10. A method of preparing europium-activated gadolinium oxide cathodoluminescent phosphor in order to improve its performance, said method comprising:
    (a) forming a solution of eruopium- and gadolinium-containing compounds wherein the relative gram-atom proportion of europium to gadolinium in such solution is from 0.051:1 to 0.07:1;
    (b) adding to the solution hydrogen peroxide in amount of at least 0.01 gram-mole per gram-atom of gadolinium in said solution and digesting for at least two minutes;
    (c) adding sufficient oxalate-radical-containing material to said solution to coprecipitate the gadolinium and europium from the solution as oxalates;
    (d) separating the precipitate from the residual solution; and
    (e) firing the precipitate in an atmosphere comprising oxygen at a temperature of from about 1000° C. to 1200° C. and for at least about thirty minutes.

11. A method of preparing europium-activated gadolinium oxide cathodoluminescent phosphor in order to improve its performance, said method comprising:
    (a) forming a solution of europium- and gadolinium-containing compound wherein the relative gram-atom proportion of europium to gadolinium in such solution is from 0.051:1 to 0.07:1;

(b) adding to the solution hydrogen peroxide in amount of at least 0.02 gram-mole per gram-atom of gadolinium in said solution and digesting for at least two minutes;

(c) heating the solution to a temperature of at least 80° C. and adding sufficient oxalic acid to said solution to coprecipitate the gadolinium and europium from the solution as oxalates;

(d) separating the precipitate from the residual solution; and (e) firing the precipitate in an air atmosphere at a temperature of from about 1000° C. to 1200° C. for at least about thirty minutes.

References Cited
UNITED STATES PATENTS

| | | | |
|---|---|---|---|
| 3,250,722 | 5/1966 | Borchardt | 252—301.4 |
| 3,322,682 | 5/1967 | Thompson | 252—301.4 |
| 3,357,925 | 12/1967 | Levine et al. | 252—301.4 |

TOBIAS E. LEVOW, *Primary Examiner.*

R. D. EDMONDS, *Assistant Examiner.*